United States Patent
Takahashi et al.

(10) Patent No.: US 6,198,189 B1
(45) Date of Patent: Mar. 6, 2001

(54) MOTOR-DRIVEN DEVICE HAVING IMPROVED WATER-PROOFNESS

(75) Inventors: Terumitsu Takahashi; Masashi Yamamura, both of Hamamatsu (JP)

(73) Assignee: Asmo Co., Ltd., Kosai (JP)

( * ) Notice: Subject to any disclaimer, the term of this patent is extended or adjusted under 35 U.S.C. 154(b) by 0 days.

(21) Appl. No.: 09/443,178

(22) Filed: Nov. 19, 1999

(30) Foreign Application Priority Data

Mar. 5, 1999 (JP) .................................................. 11-058833

(51) Int. Cl.$^7$ .................................................. H02K 5/00
(52) U.S. Cl. ................ 310/89; 310/88; 310/42; 310/91
(58) Field of Search .................. 310/89, 91, 42, 310/88, 62, 63

(56) References Cited

U.S. PATENT DOCUMENTS

| | | | |
|---|---|---|---|
| 5,243,245 | * | 9/1993 | Oba .......................................... 310/89 |
| 5,391,837 | * | 2/1995 | Carey ....................................... 174/50 |
| 5,763,974 | * | 6/1998 | Vacca ....................................... 310/152 |
| 5,949,173 | * | 9/1999 | Wille et al. ............................. 310/220 |

* cited by examiner

Primary Examiner—Elvin Enad
Assistant Examiner—Thanh Lam
(74) Attorney, Agent, or Firm—Fish & Richardson P.C.

(57) ABSTRACT

In a motor driven device, a yoke of a motor has a flange at a side of its opening. An end plate sized smaller than the flange is formed with tongues on its outer circumferential periphery so that the end plate is press-fit in position in the yoke through the tongues. An annular packing is disposed around an annular ring part of the end plate so that the packing encircles the end plate when the flange of the yoke is fixed to a housing of a pump. The packing fluid-tightly seals the inside of the yoke from an outside.

19 Claims, 3 Drawing Sheets

MOTOR-DRIVEN DEVICE HAVING IMPROVED WATER-PROOFNESS

CROSS REFERENCE TO RELATED APPLICATION

This application relates to and incorporates herein by reference Japanese Patent Application No. 11-58833 filed on Mar. 5, 1999.

BACKGROUND OF THE INVENTION

1. Field of the Invention

The present invention relates to a motor-driven device for use in a motor-driven coolant pump device in a vehicle engine cooling system, and a motor-driven hydraulic pump device in a vehicle anti-lock braking system or the like.

2. Related Art

In a motor-driven coolant pump device used in a vehicle, as shown in FIG. 5 for instance, a motor 51 is fixed to a pump 50 in a manner exposed externally from the pump 50. Specifically, the motor 51 is fixed to a fixation surface 52a formed on a housing 52 of the pump 50. Its output shaft 53 passes the housing 52 from the fixation surface 52a and protrudes into a pump chamber 54. An impeller 55 is fixed to the output shaft 53 in the pump chamber 54.

A casing 57 of the motor 51 has a bottomed cylindrical yoke 58 and an end plate 59 which closes an opening 58a of the yoke 58. A bearing 60 which supports the output shaft 53 and a brush holder 61 are fitted in the end plate 59.

An O-ring 63 is accommodated in a ring-shaped groove 62 formed on the end plate 59 of the motor 51 and press-fit to the fixation surface 52a so that external splash water may not enter the inside of the motor 51 and the pump chamber 54. Further, an O-ring 66 is held in a stepped part 65 formed in an spigot-joint of the end plate 59 and abuts the inside surface of the yoke 58 so that the external splash water may not enter the inside of the motor 51. Thus, the coolant pump device is constructed to be water-proof.

The end plate 59 is formed by die-cutting a metal plate in the similar manner as the yoke 58 is. Therefore, its dimensional accuracy is not high enough. However, the end plate 59 is required to have a high dimensional accuracy, because the groove 63 or the stepped part 65 requires a high dimensional accuracy for the O-rings 63 and 66 to provide a high sealing performance.

In another motor 69 which requires no O-rings for restricting the splash water from entering, a seal member 68 is fixed to the outer surface of an end plate 67 as shown in FIG. 6. The seal member 68 is constructed from a stack of steel plates each of which is covered with a synthetic resin film 68a. The seal member 68 is pressed to the fixation surface 52a to restrict the splash water from entering the pump chamber 54. Further, a liquid sealant is pasted at the joined surfaces between en end plate 67 and the yoke 58 at the time of assembling to restrict the splash water from entering the inside of the motor 69. The end plate 59 is not required to have a high dimensional accuracy in the motor 69.

However, the accuracy of fixing the motor 69 to the housing 52 in a direction of the output shaft 53 is lessened depending on variations of the synthetic resin film 68a covering the seal member 68, because the motor 69 is fixed to the housing 52 via the seal member 68. The accuracy of assembling the motor 69 in the direction of the output shaft 54 also is lessened, because the liquid sealant is pasted between the end plate 67 and the flange of the yoke 58 to seal the inside of the a casing 70.

SUMMARY OF THE INVENTION

It is a primary object of the present invention to improve a water-proofness of a motor-driven device with a simple construction.

It is another object of the present invention to provide a water-proofness without an end plate which has a high dimensional accuracy.

It is a further object of the present invention to provide a sealing construction without lessening an accuracy of fixing and assembling of a motor.

According to a motor-driven device of the present invention, a yoke of an electrical motor has a flange at a side of its opening. An end plate sized smaller than the flange is formed with tongues so that the end plate is press-fit in position in the yoke through the tongues. An annular elastic packing is disposed around an annular ring part of the end plate so that the packing encircles the end plate when the flange of the yoke is fixed to a housing of a pump. The packing fluid-tightly seals the inside of the yoke from an outside.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
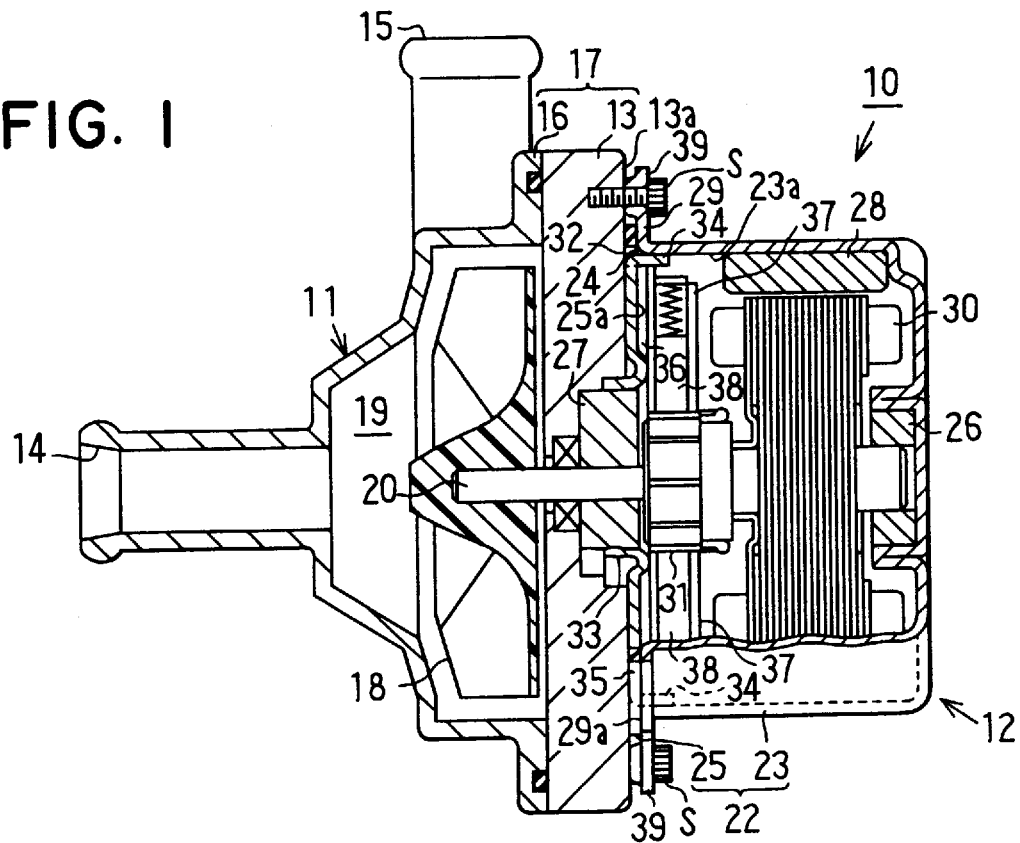
FIG. 1 is a sectional view of a fluid pump device using an electrical motor according to a first embodiment of the present invention.

Referring first to FIG. 1, an motor-driven fluid pump device 10 comprises a pump 11 and a direct current motor 12.

The pump 11 has a housing 17 which includes a base 13 and a casing 16 having an inlet port 14 and an outlet port 15. A pump chamber 19 is formed inside the housing 17 to accommodate an impeller 18 therein. The base 13 has a fixation surface 13a to which the motor 12 is fixed.

A casing 22 of the motor 12 has a bottomed cylindrical yoke 23 and, an annular disk-shaped end plate 25 closing an opening 24 of the yoke 23. An output shaft 20 of the motor 12 is supported by a pair of bearings 26 and 27 fit in the bottom of the yoke 23 and in the end plate 25 in a manner to protrude into the housing 17 of the pump 11.

Figure 2:
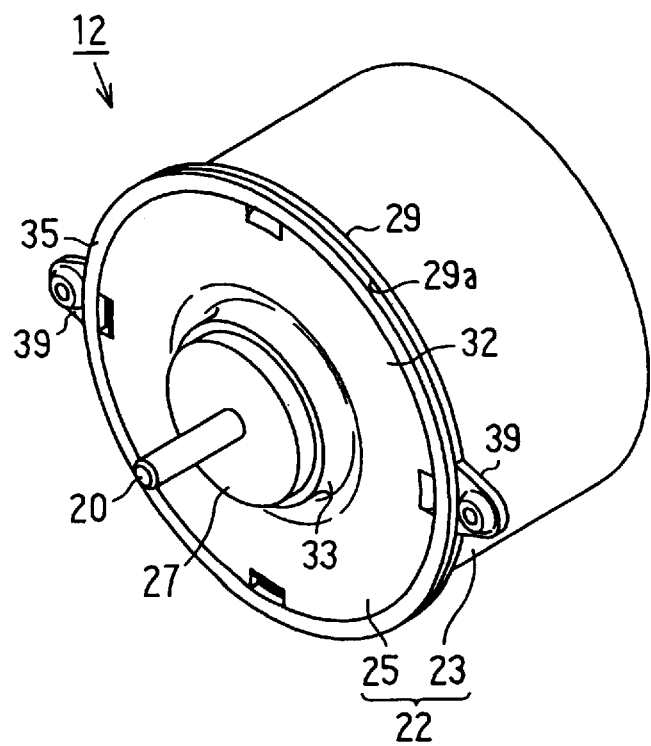
FIG. 2 is a perspective view of the electrical motor used in the first embodiment viewed from an end plate side.

The yoke 23 is made of a magnetic metal to provide a magnetic circuit in a stator side. A pair of permanent field magnets 28 are fixedly attached to an inside surface 23a of the yoke 23. The yoke 23 and the field magnets 28 provide a stator of the motor 12. As shown in FIG. 2, the yoke 23 is formed with a flange 29 along an entire circumferential periphery at the opening 24. The flange 29 has an end surface 29a which faces the base 13 along its entire circumference. The flange 29 is unitarily formed with a plurality of fixing tongues 39 which protrudes outwardly from the circumferential periphery to fix the motor 12 to the fixation surface 13a of the pump 11.

The output shaft 20 supports thereon an armature 30 (core and windings) at a position facing the field magnets 28, and a commutator 31 at a position closer to the end plate 25. The armature 30 and the commutator 31 provide a rotor of the motor 12.

Figure 3:
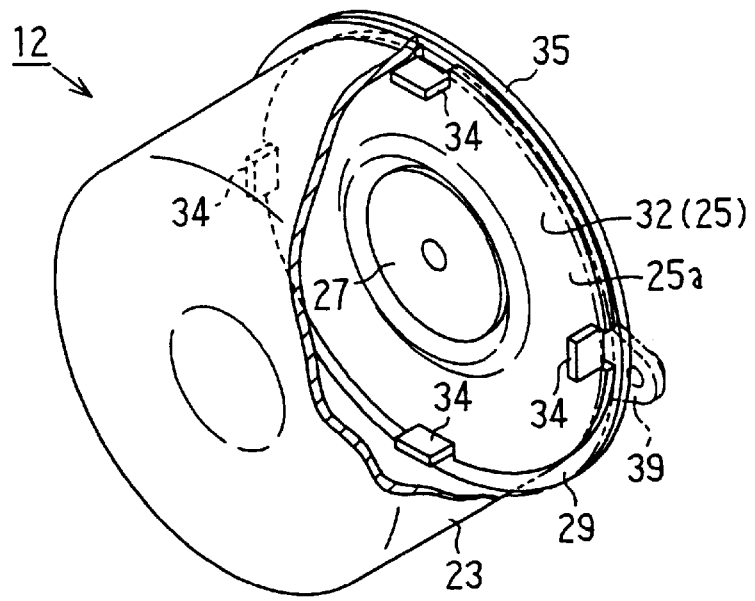
FIG. 3 is a perspective view of the electrical motor used in the first embodiment partially in section and viewed from a yoke side.

As shown in FIGS. 2 and 3, the end plate 25 is shaped in an annular disk by die-cutting a metal plate. It is placed in position at the inside of the outer circumferential edge of the end surface 29a, and has an outer circumferential peripheral part or annular ring part 32 which annularly abuts the end surface 29a. Specifically, the outer diameter of the end plate 25 is sized smaller than that of the flange 29. The annular ring part 32 is shaped to be capable of abutting the fixation surface 13a in a manner to annularly surround the output shaft 20 at the inside of the outer periphery of the end face 29a. A cylindrical part 33 is formed in the center of the end plate 25 so that the bearing 27 is press-fit in the cylindrical part 33. The bearing 33 passes the cylindrical part 33 and is received in the base 13 together with the cylindrical part 33.

The end plate 25 has a plurality of resilient pressing tongues 34 as a resilient fitting and abutting part which fixes the end plate 25 to the yoke 23 at the opening 24 under a condition that the annular ring part 32 is in abutment with the fixation surface 13a. Each resilient pressing tongue 34 is formed to extend in an axial direction from an inner side surface 25a of the end plate 25 and is spaced apart from the adjacent one a uniform angular interval along the inner periphery of the opening 24 of the yoke 23. The tongues 34 resiliently abuts the inner side surface 23a of the yoke 23. The resilient tongues 34 are made unitarily with the end plate 25 which is made by die-cutting.

An elastic packing 35 is provided as a seal member around the outside of the annular ring part 32 is a manner that it is sandwiched between the fixation surface 13a and the flange 29. Thus, when the annular ring part 32 is in abutment with the fixation surface 13a, the packing 35 encircles the end plate 25. The packing 35 is an annular rubber ring which has a generally rectangular cross section, and its thickness, that is, length in the axial direction of the output shaft 20, is larger than the thickness of the annular ring part 32 of the end plate 25. A trapezoidal insulating part 36 made of a resin is placed on the inner side surface 25a of the end plate 25 at the outside of the cylindrical part 33. Brush holders 37 are provided integrally with the insulating part 36. A plurality of brushes 38 are supported by the brush holders 37 to slide on the commutator 31. The brush 38 which is connected to a negative pole side of an electrical power source for supplying an electrical power to the armature 30 is electrically connected to the end plate 25 via a lead (not shown) welded to the inner side surface 25a of the end plate 25.

The motor 12 is fixed to the base 13 by threads S which pass through the tongues 39 of the flange 29 of the yoke 23 and the base 13 so that the annular ring part 32 of the end plate 25 abuts the fixation surface 13a.

When the resilient tongues 34 of the end plate 25 are fit into the yoke 23 in a manufacturing process of the motor 12, the resilient tongues 34 abut the inner side surface 23a of the yoke 23 under a resiliently pressed condition so that the end plate 25 is press-fit in the yoke 23 through the resilient tongues 34. As a result, the end plate 25 may easily be press-fit with the yoke 23, even if the accuracy of the inner radial diameter of the inner side surface 23a of the yoke 23 or of the outer radial diameter of the resilient tongues 34 of the end plate 25 is not high enough. That is, the end plate 25 and the yoke 23 need not be sized with high accuracy, and the both are press-fit to each other by simply inserting the end plate 25 into the yoke 23.

The end plate 25 is easily fit in position relative to the yoke 23, because the resilient tongues 34 which has an elastic modulus higher than that of a synthetic resin are resiliently pressed to the inner side surface 23a of the yoke 23. As a result, the end plate 25 is fixed assuredly to the yoke 23 even if the yoke 23 and the end plate 25 are sized with a lower dimensional accuracy.

When the end plate 25 is fixedly attached to the fixation surface 13a of the base 13 in a manufacturing process of the pump device 1, the annular ring part 32 of the end plate 25 abuts the fixation surface 13a, and the output shaft 20 and the yoke 23 are fixed under a condition that both are positioned relative to the fixation surface 13a through the end plate 25. The packing 35 disposed around the annular ring part 32 abuts the fixation surface 13a to annularly enclose the end plate 25. As a result, the packing 35 fluid-tightly separates the pump side and the motor side and fluid-tightly seals the inside of the casing 22 fluid-tightly. Thus, the end plate 25 need not be formed with a groove thereon with high accuracy for accommodating an O-ring therein. Further, no sealing member such as a stack of steel plates covered with a synthetic resin film is necessitated relative to the casing 22 in the axial direction of the output shaft 20.

The brush 38 of the negative side is electrically connected to the end plate 25 and the yoke 23 which are made of an electrically conductive metal. Therefore, the negative side brush is grounded to the end plate 25 of the motor 12 which is in contact with the housing 17.

The first embodiment provides the following advantages.

(a) When the end plate 25 of the motor 12 is fixed to and in abutment with the fixation surface 13a of the base 13, the annular ring part 32 of the end plate 25 annularly abuts the fixation surface 13a and the motor 12 is fixed in predetermined positional relation via the end plate 25. Further, the annular packing 35 disposed radially outside the annular ring part 32 abuts the fixation surface 13a while annularly sealing the end plate 25 at the radially inside location.

Therefore, no groove for an O-ring is necessitated to be formed in the end plate 25 nor no seal member is necessitated between the end plate 25 and the base plate 25. As a result, the motor 12 is fixedly attached to the fixation surface 13a at the side of the base 13 through which the output shaft 20 passes. Further, the motor 12 is separated from the pump 11 in a sealed manner by the O-ring 35, and the inside of the casing 22 is sealed from the outside by the O-ring 35. In addition, the end plate 25 is not required to have a high dimensional accuracy. The accuracy of attaching the end plate 25 to the yoke 23 is not lowered as opposed to the case in which the inside of the casing 22 is sealed with a liquid sealing material, because no seal member is provided between the yoke and the end plate 25.

The manufacturing cost is reduced, because no equipment or process for pasting the liquid seal material, for drying the pasted seal material and for removing the excessively pasted seal material are necessitated. The number of seal member and assembling process are reduced, because the packing 35 provides two sealings, one being between the pump 11 and the motor 12 and the other between the inside of the casing 22 and the outside.

- (b) The end plate 25 is resiliently press-fit with the yoke 23 through the resilient tongues 34. Therefore, the end plate 25 is placed at the desired position, and certain variations in the inner diameter of the yoke 23 and in the outer diameter of the end plate 25 are tolerated. As a result, the dimensional accuracy at the fitting parts may be lowered, while ensuring easy assembling of the casing 22.
- (c) The resilient tongues 34 are made of a metal having a high elastic modulus unitarily with the end plate 25. Therefore, the end plate 25 is fit with the yoke 23 assuredly and easily even if the yoke 23 and the end plate 25 are sized with less high accuracy. As a result, both the end plate 25 and the yoke 23 may be made by die-cutting a metal plate.
- (d) The negative side brush 38 is electrically connected to the end plate 25 made of a metal. Therefore, the brush 38 is grounded to the pump 17 through the end plate 25 which is in contact with the housing 17.

Second Embodiment

Figure 4:
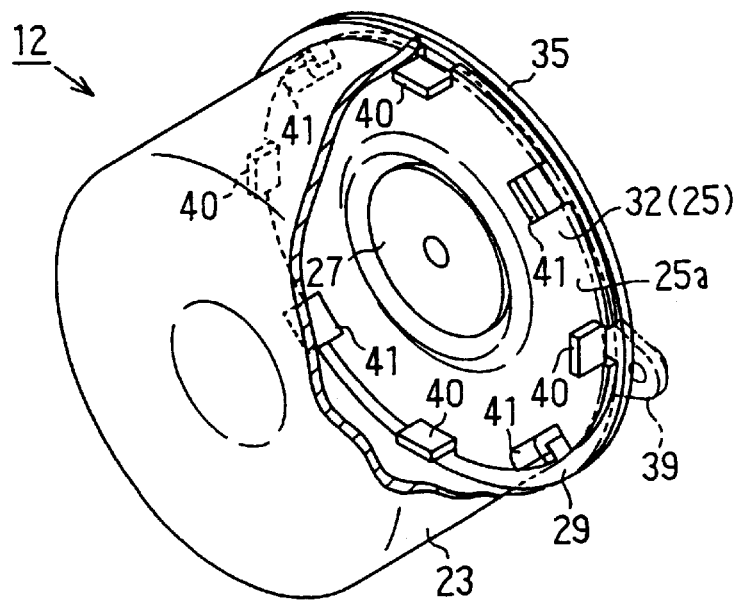
FIG. 4 is a perspective view of an electrical motor used in a second embodiment of the present invention partially in section and viewed from a yoke side.
Figure 5:
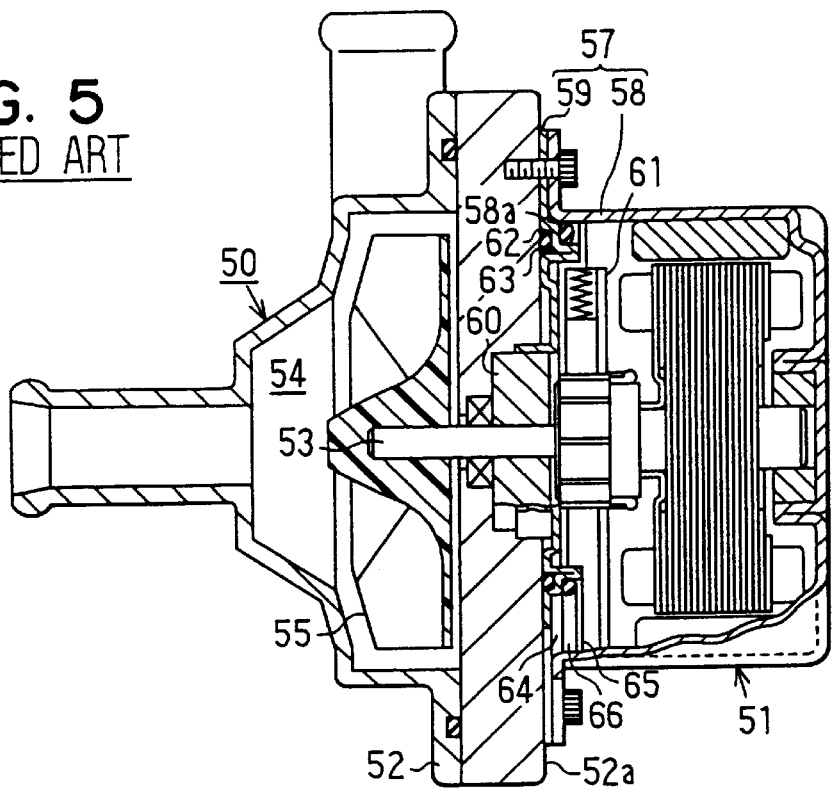
FIG. 5 is a sectional view of a fluid pump device according to one related art.
Figure 6:
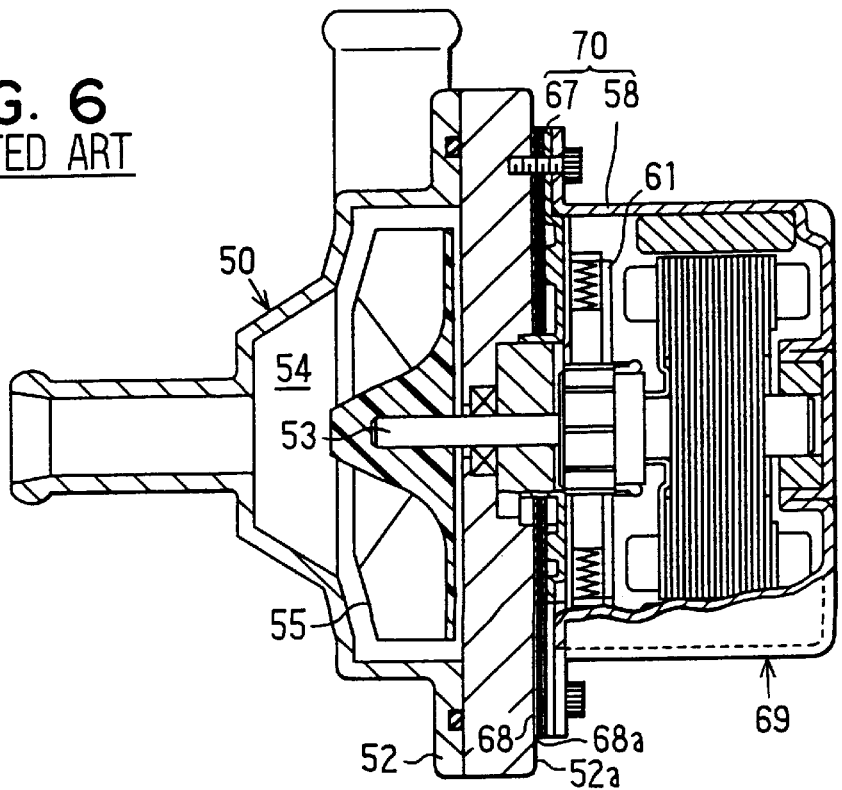
FIG. 6 is a sectional view of a fluid pump device according to another relate art.

In the second embodiment, as shown in FIG. 4, the end plate 25 is unitarily formed with a plurality of tongues 40 and 41 separately and alternately in the circumferential direction. Each tongue 40 is shaped to position the end plate 25 relative to the yoke 23 while only slightly contacting the yoke 23. Each tongue 41 is shaped to start press-fitting when the tongues 40 are inserted into the yoke 23 a predetermined distance, and to sufficiently press-fit the end plate 25 to the yoke 23 when the tongues 40 are inserted further. According to the second embodiment, in addition to the advantages (a) to (d) of the first embodiment, the end plate 25 is easily fixed to the yoke 23 while guiding the end plate 25 by the tongues 40. Therefore, the fixing of the end plate 25 is made with ease and is enabled to be automated.

The first and the second embodiments may be modified as follows.

1. (1) The packing 35 may be disposed in contact with the circumferential edge of the annular ring part 32 of the end plate 25. Further, it may be disposed to contact both of the end surface 29a of the flange 29 and the circumferential edge of the annular ring part 32.
2. (2) The end plate 25 and the yoke 23 may be fit together not by the tongues 34, 40, 41 but by a conventional spigot-joint fitting so that the above advantage (a) is attained.
3. (3) The end plate 25 may be made by casting or by forging so that the above advantage (a) is attained.
4. (4) The end plate 25 and the tongues 34, 40, 41 may be made of a synthetic resin so that the above advantages (a) and (b) are attained.
5. (5) The bush holders 37 may be fixed to the bottomed part of the yoke 23.
6. (6) The yoke 23 may have openings at both axial sides. The brush holders 37 may be fixed to another end plate which is fitted to close the opening opposite the opening 24.
7. (7) The flange 29 may be formed along the inner circumferential edge of the opening 24 of the yoke 23, or along both of the inner circumferential edge and the outer circumferential edge.
8. (8) The end face 29a of the flange 29 may be formed in a taper the inner diameter of which increases toward the fixation surface 13a.
9. (9) The flange 29 may be shaped wavy along its circumference.
10. (10) The flange 29 may be inclined a predetermined angle relative to the output shaft 20, and the motor 12 may be fixed under a condition that the output shaft 20 is inclined the same predetermined angle relative to the fixation surface 13a.
11. (11) The annular ring part 32 of the end plate 25 may be discontinuous between the adjacent two of the tongues 34, 40, 41.
12. (12) The flange 29 and the yoke 23 may be different in shape. For instance, the flange 29 may be square-shaped relative to the circular sectional shape of the yoke 23.
13. (13) The flange 29 and the end surface 29a may be different in shape. For instance, the flange 29 may be square-shaped relative to the circular shape of the end surface 29a.
14. (14) The end face 29a may be provided by the axial end of the yoke 23 without providing the flange 29.
15. (15) The motor 12 may be a series-wound motor, a shunt motor or a compound motor other than a magnet type motor.
16. (16) The motor 12 may be a brushless motor.
17. (17) The motor 12 may be used for any types of motor-driven pump device such as an engine coolant recirculation pump device, a vehicle wiper washer pump device, or a non-vehicle pump device.

The present invention is not limited to the disclosed embodiments and modifications, but may be implemented in many other ways without departing from the spirit of the invention.

What is claimed is:

1. A motor-driven device comprising:

an electrical motor including a yoke and an output shaft, the yoke having an opening through which the output shaft passes; and an end plate closing the opening of the yoke and capable of abutting a fixation surface of a base through which the output shaft passes, wherein the yoke has a flange formed along a circumferential periphery of the opening to have an annularly closed end surface, wherein the end plate has an abutting part disposed inside an outer circumferential edge of the end surface and capable of abutting the fixation surface to annularly encircle the output shaft, and has a fitting part fit in the opening to fix the end plate to the yoke, and wherein a seal member is disposed outside the abutting part of the end plate to annularly encircle the end plate therein and is disposed between the flange of the yoke and the base in tight contact with the flange and the base, under a condition that the abutting part is in abutment with the fixation surface.

2. A motor-driven device of claim 1, wherein:

the fitting part is formed at a plurality of locations on the end plate to extend in a direction opposite the fixation surface, and is resilient to be press-fit with an inside surface of the yoke.

3. A motor-driven device of claim 2, wherein:

the end plate is made of a metal plate by die-cutting, and the abutting part and the fitting part are unitary.

4. A motor-driven device of claim 3, wherein:

the motor is a direct current type which has a field magnet on a stator side and a commutator on a rotor side; and a negative side brush is electrically connected to the end plate.

5. A motor-driven device of claim 1, wherein:

the fitting part includes guide members and resilient members alternately provided on the end plate in a circumferential direction, the guide members having substantially a same outer diameter as an inner diameter of the yoke and being for guiding the end plate into the yoke.

6. A motor-driven device of claim 1, wherein:

the end plate includes a flat part which abuts an inner periphery of the flange.

7. A motor-driven device of claim 6, wherein:

the fitting part is formed at a plurality of locations on the end plate to extend in a direction opposite the fixation surface, and is resilient to be press-fit with an inside surface of the yoke.

8. A motor-driven device of claim 7, wherein:

the fitting part includes guide members and resilient members alternately provided on the end plate in a circumferential direction, the guide members having substantially a same outer diameter as an inner diameter of the yoke and being for guiding the end plate into the yoke.

9. A motor-driven device of claim 1, wherein:

a bearing for the output shaft is supported by the end plate and protrudes from the motor, a protruded part of the bearing being fitted in the base.

10. A motor-driven device of claim 9, wherein:

the end plate includes a flat part which abuts an inner periphery of the flange.

11. A motor-driven device of claim 10, wherein:

the fitting part is formed at a plurality of locations on the end plate to extend in a direction opposite the fixation surface, and is resilient to be press-fit with an inside surface of the yoke.

12. A motor-driven device of claim 11, wherein:

the fitting part includes guide members and resilient members alternately provided on the end plate in a circumferential direction, the guide members having substantially a same outer diameter as an inner diameter of the yoke and being for guiding the end plate into the yoke.

13. The device of claim 1, wherein said seal member has a thickness larger than that of the abutting part of the end plate.

14. A motor-driven device comprising:

a housing having a base and accommodating a movable member therein;

a cylindrical body having an opening at one axial end thereof and an annular flange around the opening, the body accommodating therein a motor output shaft connected to drive the movable member;

an end plate having an annular ring and a part extending perpendicularly from the annular ring, the annular ring having an outer diameter smaller than a diameter of the flange and press-fit in the cylindrical body with the part being in abutment with the cylindrical body to close the opening, the annular ring being fixed to the base in direct contact therewith while encircling the output shaft; and a single elastic member disposed between the base and the flange in direct contact with the base and the flange and surrounding only an outer circumferential periphery of the annular ring.

15. A motor-driven device of claim 14, wherein:

the part of the end plate includes a plurality of resilient tongues arranged on an outer circumferential periphery of the annular ring.

16. A motor-driven device of claim 14, wherein:

the part of the end plate includes a plurality of first tongues and second tongues arranged alternately on an outer circumferential periphery of the annular ring, the first tongues being resilient and the second tongues being non-resilient.

17. A motor-driven apparatus of claim 14, further comprising:

a commutator mounted on the output shaft in the cylindrical body; and brushes held in contact with the commutator, one of the brushes being electrically connected to the end plate, wherein the housing and the end plate are made of metals.

18. The device of claim 14, wherein said seal member has a thickness larger than that of the abutting part of the end plate.

19. A motor-driven device comprising:

a housing having a base and accommodating a movable member therein;

a cylindrical body having an opening at one axial end thereof and an annular flange around the opening, the body accommodating therein a motor output shaft connected to drive the movable member;

an end plate having an annular ring and a part extending perpendicularly from the annular ring, the annular ring having an outer diameter smaller than a diameter of the flange and press-fit in the cylindrical body with the part being in abutment with the cylindrical body to close the opening, the annular ring being fixed to the base in direct contact therewith while encircling the output shaft; and a single elastic member disposed between the base and the flange in direct contact with the base and the flange and surrounding only an outer circumferential periphery of the annular ring, wherein the part of the end plate includes a plurality of first tongues and second tongues arranged alternately on an outer circumferential periphery of the annular ring, the first tongues being resilient and the second tongues being non-resilient.

\* \* \* \* \*